United States Patent [19]
Cary

[11] 3,715,141
[45] Feb. 6, 1973

[54] CONVERTIBLE TRAILER CONSTRUCTION

[76] Inventor: John W. Cary, Route 2, Kimberly, Idaho 83341

[22] Filed: Jan. 5, 1971

[21] Appl. No.: 103,977

[52] U.S. Cl..................296/23 R, 254/45, 280/150.5
[51] Int. Cl. ...............................................B60p 3/32
[58] Field of Search ................296/23 R, 23 A, 23 H; 280/150.5; 254/45, 86 R

[56] References Cited

UNITED STATES PATENTS

| | | | |
|---|---|---|---|
| 3,086,752 | 4/1963 | Wetter................................254/86 R |
| 1,564,257 | 12/1925 | Lippman ............................296/23 A |

FOREIGN PATENTS OR APPLICATIONS 1,205,788 8/1959 France................................296/23 A

*Primary Examiner*—Philip Goodman
*Attorney*—Clarence A. O'Brien and Harvey B. Jacobson

[57] ABSTRACT

A trailer body construction for disposition upon a trailer chassis. The body construction includes a center elongated longitudinally extending horizontal flooring section secured to the associated chassis in generally transverse centered position thereon as well as a pair of elongated longitudinally extending opposite side sections pivotally secured along one pair of longitudinal edge portions to the corresponding side edge portions of the center section for swinging between horizontal positions forming side extensions of said center section and upwardly convergent positions with their free edge portions disposed at least closely adjacent each other. The body construction includes both triangular opposite end wall sections for closing the opposite ends of the body construction when the side sections are swung to upwardly convergent positions and generally rectangular end wall sections for securement between corresponding ends of the side wall sections when the latter are disposed in generally parallel upstanding relation. Also, the center section is provided with structure for supporting the bows of a camping tent and the side sections include outer corner jack assemblies for supporting the side sections in substantially coplanar relation with the center section when the trailer body construction is being utilized as the base of a camping trailer.

7 Claims, 10 Drawing Figures

PATENTED FEB 6 1973

John W. Cary
INVENTOR.

BY Clarence A. O'Brien
and Harvey B. Jacobson
Attorneys

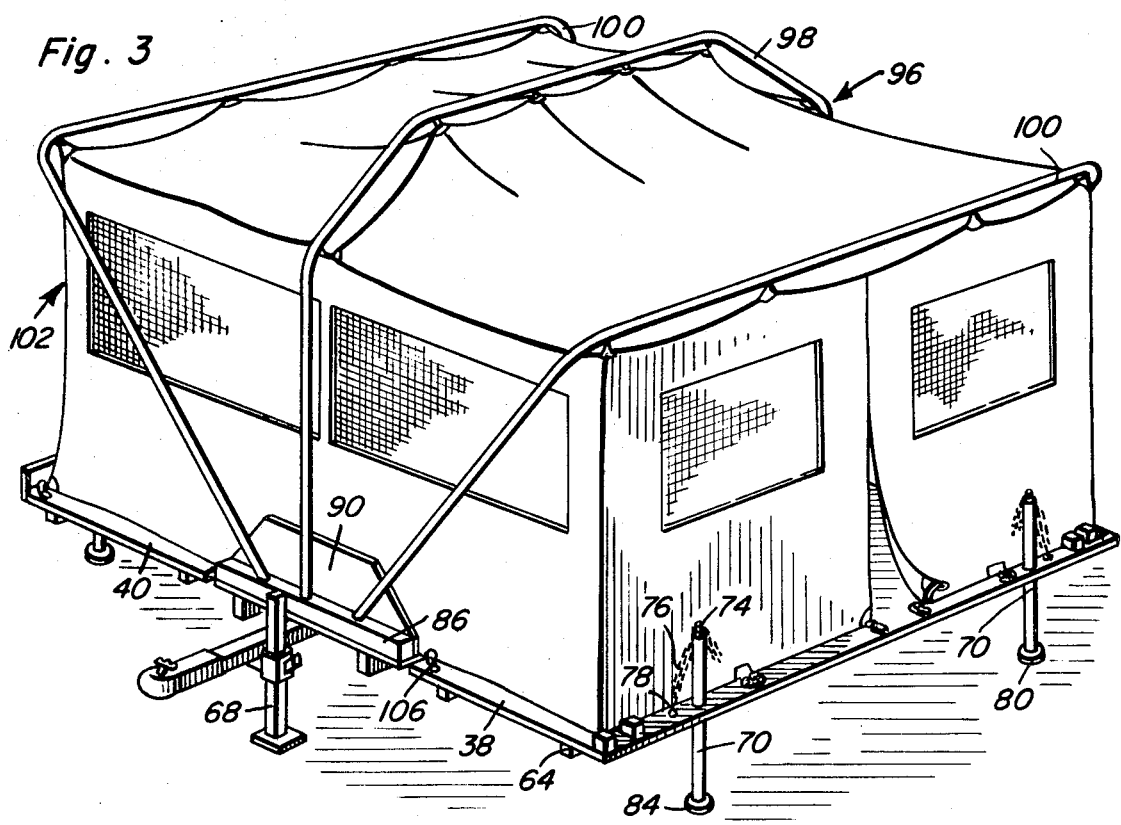
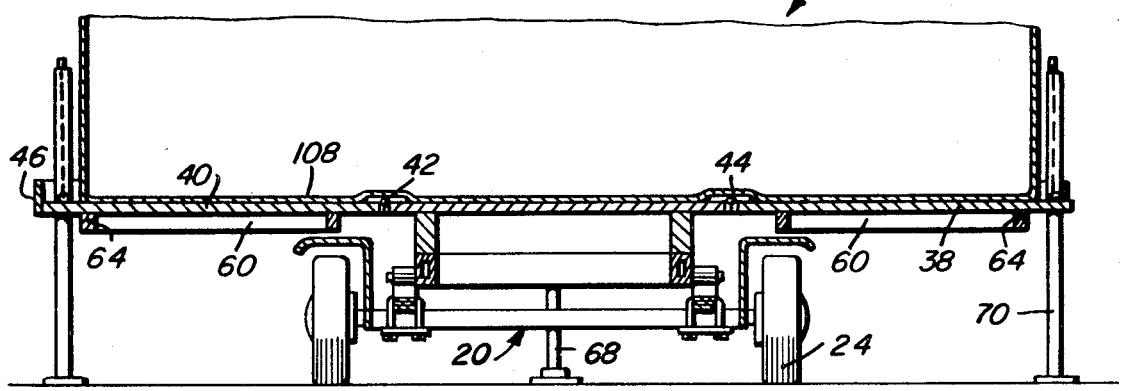
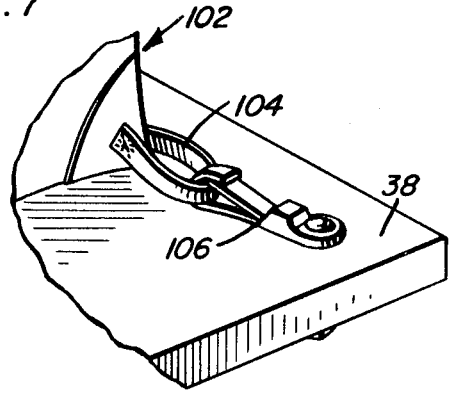
John W. Cary
INVENTOR

PATENTED FEB 6 1973

John W. Cary
INVENTOR

BY Clarence A. O'Brien
and Harvey B. Jacobson
Attorneys

CONVERTIBLE TRAILER CONSTRUCTION

The trailer construction of the instant invention has been designed as a multipurpose trailer which may be used not only as an enlarged base for a large camping trailer but which may also be utilized as a load box for trailering bulk loads. Further, the trailer construction, when being utilized for camping purposes, may be folded to a compact condition defining a camping equipment enclosing body of generally triangular cross-sectional shape and reasonably low silhouette whereby the trailer will offer less resistance to cross winds when being trailed and the driver of a vehicle towing the trailer is provided a rearward view through the mirrors of his vehicle blocked only by the upper apex portion of the trailer construction when it is folded for transit.

The main object of this invention is to provide a trailer construction which may be utilized to form an enlarged horizontal base for a large camping trailer and yet which may be folded to reasonably compact state for towing behind a towing vehicle.

Another object of this invention, in accordance with the immediately proceeding object, is to provide a trailer construction which, when folded for transit, defines a body of triangular cross-sectional shape for less resistance to cross winds and better rearward viewing by the driver of the towing vehicle.

Still another object of this invention is to provide a trailer construction which may be also utilized to form an open top generally rectangular load carrying box.

A further important object of this invention is to provide a convertible trailer construction including leveling standards or jacks which may be readily utilized for the purpose of leveling the flooring sections of the trailer when the latter is being utilized as an enlarged base for a large camping trailer.

A final object of this invention to be specifically enumerated herein is to provide a trailer construction in accordance with the preceding objects which will conform to conventional forms of manufacture, be of simple construction and easy to use so as to provide a device that will be economically feasible, long lasting and relatively trouble free in operation.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIG. 3 is a perspective view of the trailer construction fully extended to define an enlarged horizontal base and having a large camping tent erected thereon;

FIG. 4 is a fragmentary transverse sectional view taken substantially upon a plane passing through the center of the assemblage illustrated in FIG. 3;

FIG. 7 is a fragmentary perspective view illustrating the manner in which the lower marginal edge portions of the side flaps of the camping tent may be secured to the peripheral portions of the enlarged base or flooring defined by the trailer construction when it is fully extended;

Figure 1:
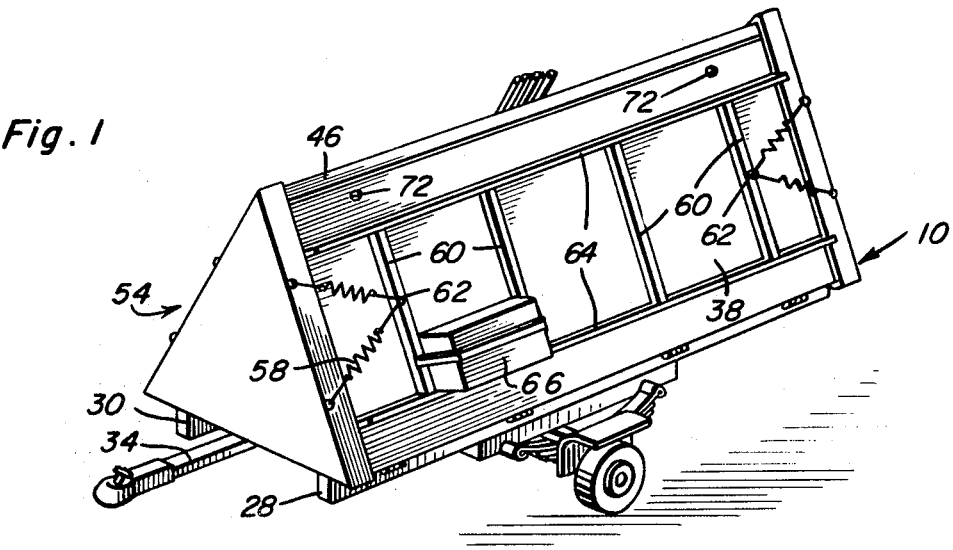
FIG. 1 is a side elevational view of the convertible trailer of the instant invention with the trailer body forming components disposed in their folded positions to define a camping equipment enclosing body of low silhouette and having a triangular cross-sectional shape.

Referring now more specifically to the drawings the numeral 10 generally designates the trailer construction of the instant invention. The trailer construction 10 includes a basic trailer chassis of substantially conventional design including a pair of opposite side longitudinal members 14 and 16 interconnected by means of longitudinally spaced transversely extending members 18. An axle assembly referred to in general by the reference numeral 20 is provided and is suspended from the longitudinal members 14 and 16 by means of spring assemblies 22. The opposite ends of the axle assembly 20 have wheels 24 mounted thereon.

The trailer construction 12 further includes a body assembly referred to in general by the reference numeral 26 and the body assembly defines a subframe including opposite side longitudinal members 28 and 30 interconnected by means of longitudinally spaced and transversely extending transverse members 32. The body assembly 26 further includes a forwardly projecting tongue assembly 34 of conventional design and the tongue assembly 34 is supported from the body assembly 26 in any convenient manner (not shown) and may also be in part supported from the main frame consisting of the members 14, 16 and 18, if desired.

Figure 2:
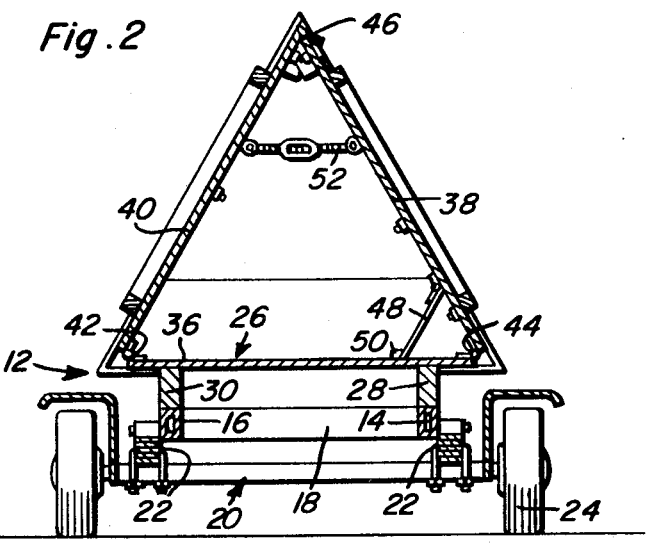
FIG. 2 is a transverse vertical sectional view taken substantially upon a plane passing through the center of the assemblage of FIG. 1.

A center flooring section 36 is secured over the longitudinal members 28 and 30 as well as the transverse members 32 and the trailer construction further includes a pair of opposite side sections 38 and 40 having one pair of marginal edge portions thereof secured to corresponding side edges of the center flooring section 36 by means of piano-type hinge assemblies 42. The side sections 38 and 40 are swingable from the horizontal positions thereof illustrated in FIGS. 3 and 4 of the drawings forming substantially coplanar extensions of the center flooring section 36 and upstanding upwardly convergent positions such as those illustrated in FIGS. 1 and 2 of the drawings wherein a body construction of generally triangular cross-sectional shape is provided.

The free swinging edge portion of the side section 40 includes a right angularly directed flange portion 46 and it will be noted that the flange portion 46 passes over the free edge portion of the side section 38 when the sections 38 and 40 are disposed in their upwardly convergent positions. In addition, the opposite ends of the section 38 include pivoted props 48 whose free lower ends are abuttingly engageable with abutments 50 carried by the opposite ends of the center flooring section 36 in order to support the side section 38 in its upstanding inclined position illustrated in FIG. 2 of the drawings preparatory to swinging the side section 40 to its upstanding inclined position illustrated in FIG. 2 of the drawings. After the side sections 38 and 40 have been swung to the positions thereof illustrated in FIG. 2, a pair of turnbuckle fasteners 52 are secured between the upper marginal edge portions of the side sections 38 and 40 at their opposite ends in order to retain side sections 38 and 40 in the positions thereof illustrated in FIG. 2.

Figure 9:
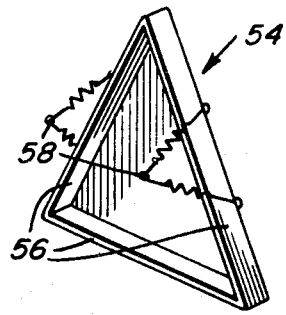
FIG. 9 is a perspective view of one of the triangular end walls of the trailer construction.

After the side sections 38 and 40 have been swung to the positions thereof wherein a triangular body is defined, a pair of triangular end caps such as that generally designated by the reference numeral 54 in FIG. 9 may be applied to the ends of the triangular body. The end caps or end walls 54 include peripheral right angled flange portions 56 for telescoping engagement over the opposite ends of the sections 36, 38 and 40 and a pair of elastomer anchor strap assemblies 58 are provided on each end cap and may be anchored to corresponding transverse underbracing members 60 of the side sections 38 and 40 as at 62 for removably retaining the end caps 54 in position. The underbracing of the side sections 38 and 40 also includes longitudinal members 64 and any type of weatherproof equipment such as that designated by the reference numeral 66 may be attached to the underbracing members 60 if desired.

Figure 8:
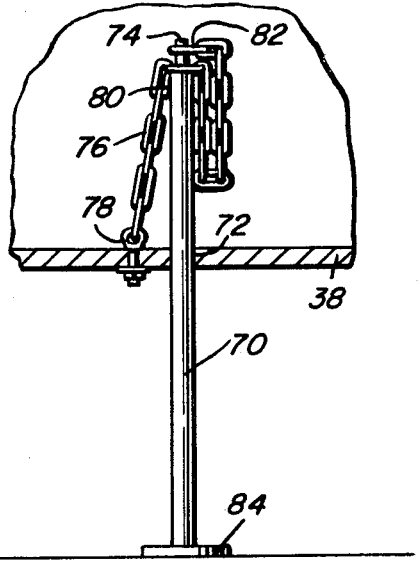
FIG. 8 is an enlarged fragmentary vertical sectional view illustrating the operational features of one of the peripheral leveling jacks or stands.
Figure 5:
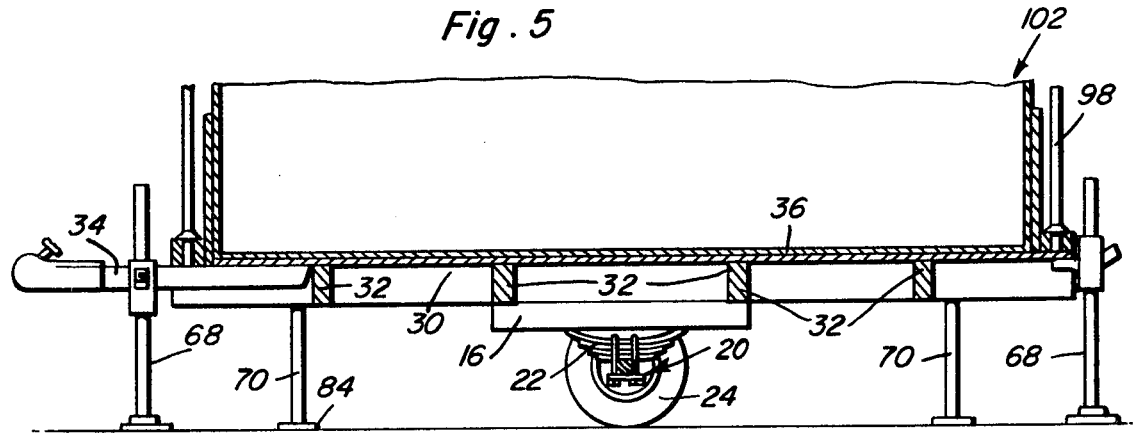
FIG. 5 is a fragmentary longitudinal vertical sectional view taken substantially upon a plane passing through the longitudinal center line of the assemblage of FIG. 3.

It may be seen from FIGS. 3 through 5 of the drawings that a pair of inexpensive jack assemblies 68 may be engaged with the tongue assembly and the rear end of the center section 36 in order to at least generally level and stationarily support the center section 36. Further, when the side sections 38 and 40 are in their horizontal positions, a pair of standards 70, see FIGS. 4 and 8 may be passed through the longitudinally spaced bores 72 formed in the opposite ends of each free edge portion of the side sections 38 and 40. Each standard 70 has a diametrically reduced upper end portion 74 and a link chain section 76 is provided for each standard 70 and has one thereof anchored to the corresponding side section adjacent the associated standard 70 as at 78 and a selected intermediate link 80 of each chain section 76 may be engaged over the diametrically reduced upper end of the corresponding standard 70 to support the associated side section in generally coplanar relation with the center section 36. Of course, the free end of the chain section 76 may have its end link 82 also engaged over the diametrically reduced upper end 74 of the associated standard 70, each of the standards 70 including a diametrically enlarged foot 84 for engagement with the ground.

Figure 6:
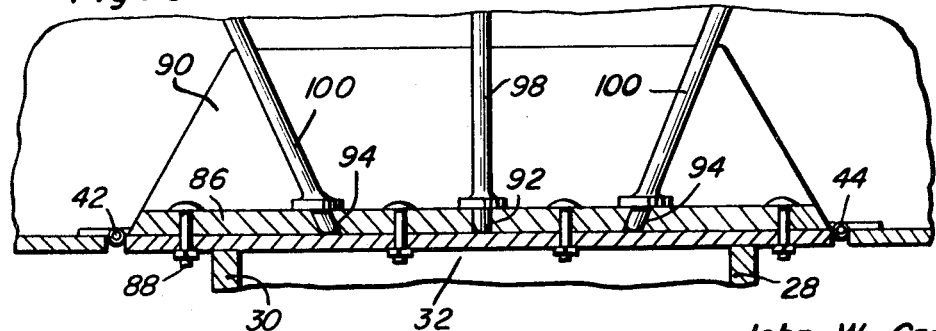
FIG. 6 is a fragmentary enlarged transverse vertical sectional view illustrating the manner in which the tent supporting bows of an enlarged camping tent may be secured to the center flooring section of the trailer construction at the opposite ends thereof.

With attention now invited more specifically to FIGS. 3, 5 and 6 of the drawings, it may be seen that the opposite ends of the center flooring section 36 include transverse bracing members 86 secured thereto as by bolts 88. Each of the bracing members 86 includes an upstanding panel section 90 and a center upright bore 92 as well as opposite side oppositely inclined bores 94. A tent assembly referred to in general by the reference numeral 96 includes a center bow 98 and a pair of opposite end bows 100 and the free ends of the legs of the bow 98 are received in the bores 92 whereas the free ends of the legs of the bows 100 are received in the bores 94 in order to support the bows 98 and 100 in their relatively inclined positions illustrated in FIGS. 3 and 6. Of course, the tent assembly 96 further includes a flexible wall tent body referred to in general by the reference numeral 102 and various portions of the top of the tent wall body 102 are supported from the upper horizontal bight portions of the bows 98 and 100 in any convenient manner (not shown). Further, the lower peripheral portions of the side walls of the tent wall body 102 have attaching loops 104 anchored thereto and the peripheral edge portions of the sections 38 and 40 include pivoted spring clips 106 which may be readily engaged with corresponding anchor loops 104 in order to secure the side wall portions of the tent wall body 102 to the peripheral edges of the platform defined by the sections 36, 38 and 40. In addition, the tent wall body 102 may include a flooring section 108 formed integrally with one or more of the side wall panels of the tent wall body 102 and positionable over the sections 36, 38 and 40 when all of the latter are horizontally disposed.

When the trailer construction is to be collapsed from the position thereof illustrated in FIG. 3, the tent supporting bows 98 and 100 may be removed and broken down and secured to the underbracing of either side section 38 and 40. Of course, the tent wall body 102 may be folded up and stored within the triangular cross-section body of the trailer for transit and the upwardly inwardly inclined sides of the triangular trailer body offer considerably less resistance to side winds. Further the driver of a vehicle towing the trailer 10 has his rearward view through the various mirrors on his vehicle blocked only by the upper apex portion of the triangular trailer body.

Figure 10:
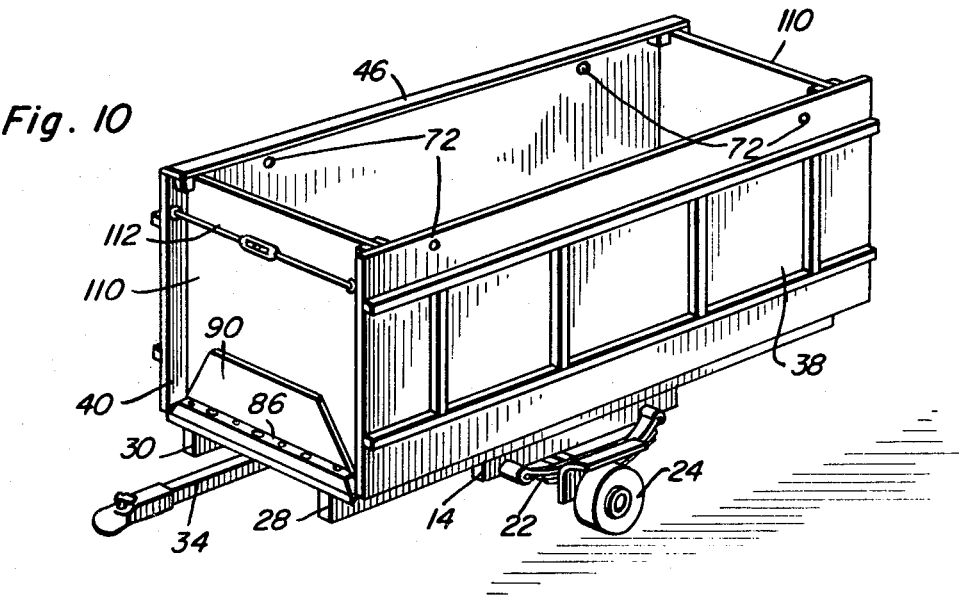
FIG. 10 is a perspective view of the trailer construction equipped with generally rectangular end walls so as to define an open top bulk load receiving body.

With attention now invited more specifically to FIG. 10 of the drawings, it may be seen that generally rectangular end wall panels 110 are also provided. The end wall panels 110 may be readily secured between the side sections 38 and 40 when the latter are disposed in upright generally parallel relation by the utilization of somewhat longer turnbuckles 112 secured between the upper marginal edge portions of the opposite ends of the side sections 38 and 40. In this manner, the trailer construction may be converted to an open top generally rectangular bulk load carrying trailer and, of course, a generally rectangular top wall may be provided for the trailer construction illustrated in FIG. 10, if desired.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. A trailer construction including a center elongated longitudinally extending generally horizontal flooring section, a pair of opposite side sections, means supporting said side sections from the opposite sides of said center section for selective disposition in first generally horizontal positions forming side continuations of the opposite sides of said center section and second upstanding upwardly convergent positions with their upper marginal edge portions at least closely adjacent each other with said flooring and side sections defining a hollow load body generally triangular in cross-sectional shape, a pair of generally triangular end wall sections removably attachable to the opposite ends of said generally triangular load body for closing the opposite ends thereof, said end wall section including peripheral flange portions removably telescopingly engageable with the end edge portions of said center and side sections.

2. The combination of claim 1 wherein said means supporting said side sections from said center section includes means for selective disposition of said side sections in generally parallel upstanding positions, and a pair of generally rectangular end wall sections removably attachable to the ends of said trailer construction in lieu of said triangular end wall sections.

3. A trailer construction including a center elongated longitudinally extending generally horizontal flooring section, a pair of opposite side sections, means supporting said side sections from the opposite sides of said center section for selective disposition in first generally horizontal positions forming side continuations of the opposite sides of said center section and second upstanding upwardly convergent positions with their upper marginal edge portions at least closely adjacent each other with said flooring and side sections defining a hollow load body generally triangular in cross-sectional shape, said means supporting said side sections from said center section including means for selective disposition of said side sections in generally parallel upstanding positions, and a pair of generally rectangular end wall sections removably positioned between said side sections for closing the ends of said trailer constructions, said rectangular end wall sections being snugly received between said side sections, and means connected between said side sections for urging the free swinging end portions together to clamp said end wall sections between said side sections.

4. The combination of claim 1 wherein the opposite ends of said center section include means for attaching the lower ends of one set of corresponding tent supporting bow legs to said trailer construction.

5. The combination of claim 4 wherein the free marginal edge portions of said side sections include longitudinally spaced tent flap anchors.

6. The combination of claim 1 including a pair of standard jacks removably associated with the opposite ends of said center section for leveling the latter, and a pair of adjustable length standards removably associated with the opposite end portions of each free edge portion of said side sections for support thereof in generally coplanar relation with said center section.

7. The combination of claim 6 wherein the opposite end portions of each free edge portion of said side sections and the opposite ends of said center section define panel portions, each of said panel portions having an upstanding bore formed therethrough, each of said upstanding bores receiving a corresponding standard jack therethrough, first and second anchor elements carried by said panel portions adjacent said bores and the upper end portions of said standard jacks, and elongated tension members each having one end anchored to one of the associated anchor elements and means spaced along its other end portion for removable anchoring to the other of the associated anchor elements.

* * * * *